(12) United States Patent
Xu et al.

(10) Patent No.: US 11,595,301 B2
(45) Date of Patent: Feb. 28, 2023

(54) METHOD AND SYSTEM FOR IMPLEMENTING L3VPN BASED ON TWO-DIMENSIONAL ROUTING PROTOCOL

(71) Applicant: TSINGHUA UNIVERSITY, Beijing (CN)

(72) Inventors: Mingwei Xu, Beijing (CN); Nan Geng, Beijing (CN); Yuan Yang, Beijing (CN); Enhuan Dong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/249,432

(22) Filed: Mar. 2, 2021

(65) Prior Publication Data

US 2021/0194802 A1 Jun. 24, 2021

Related U.S. Application Data

(63) Continuation of application No. PCT/CN2019/115662, filed on Nov. 5, 2019.

(30) Foreign Application Priority Data

Apr. 22, 2019 (CN) .......................... 201910325519.X

(51) Int. Cl.
*H04L 45/42* (2022.01)
*H04L 12/46* (2006.01)
(Continued)

(52) U.S. Cl.
CPC .......... *H04L 45/42* (2013.01); *H04L 12/4633* (2013.01); *H04L 12/4641* (2013.01);
(Continued)

(58) Field of Classification Search
CPC . H04L 45/42; H04L 12/4633; H04L 12/4641; H04L 45/566; H04L 45/586;
(Continued)

(56) References Cited

U.S. PATENT DOCUMENTS 9,203,631 B2 12/2015 Han et al.
9,769,044 B1 * 9/2017 Cirkovic ................. H04L 45/66
(Continued)

FOREIGN PATENT DOCUMENTS

CN 102571606 7/2012
CN 102571606 A * 7/2012 ......... H04L 12/4633
(Continued)

OTHER PUBLICATIONS

International Search Report from corresponding PCT Appln. No. PCT/CN2019/115662, dated Feb. 5, 2020.
(Continued)

*Primary Examiner* — Chris Parry
*Assistant Examiner* — Dixon F Dabipi
(74) *Attorney, Agent, or Firm* — Grossman, Tucker, Perreault & Pfleger, PLLC

(57) ABSTRACT

A method and system for implementing L3VPN based on a two-dimensional routing protocol. The method includes the following steps of: activating an L3VPN network to obtain a route destined to each user site; sending, by a user in a source user site, a packet to a user in a target user site, and sending the packet to an entry of a first edge routing device; performing encapsulation by the first edge routing device based on a public network IP address of the packet; and forwarding, by means of matching of two-dimensional routing, the encapsulated packet to an exit of the first edge routing device for decapsulation, and forwarding the same to the target user site via an entry of a second edge routing device.

6 Claims, 4 Drawing Sheets

(51) Int. Cl.
*H04L 45/00* (2022.01)
*H04L 45/586* (2022.01)
*H04L 45/745* (2022.01)

(52) U.S. Cl.
CPC .......... *H04L 45/566* (2013.01); *H04L 45/586* (2013.01); *H04L 45/745* (2013.01)

(58) Field of Classification Search
CPC ....... H04L 45/745; H04L 45/34; H04L 45/64; H04L 45/74
See application file for complete search history.

(56) References Cited

U.S. PATENT DOCUMENTS

| | | | | |
|---|---|---|---|---|
| 2005/0190757 | A1* | 9/2005 | Sajassi | H04L 12/2856 370/466 |
| 2006/0198368 | A1 | 9/2006 | Guichard et al. | |
| 2010/0046532 | A1* | 2/2010 | Okita | H04L 45/586 370/401 |
| 2010/0158010 | A1 | 6/2010 | Kang et al. | |
| 2015/0156142 | A1* | 6/2015 | Li | H04L 49/206 370/389 |
| 2018/0041362 | A1 | 2/2018 | Guichard et al. | |
| 2019/0258756 | A1* | 8/2019 | Minwalla | G06F 30/20 |

FOREIGN PATENT DOCUMENTS

| | | |
|---|---|---|
| CN | 103685040 | 3/2014 |
| CN | 104168173 | 11/2014 |
| CN | 04601485 | 5/2015 |
| CN | 104660607 | 5/2015 |
| CN | 105763454 | 7/2016 |
| CN | 107465614 | 12/2017 |
| CN | 107995015 | 5/2018 |
| CN | 108632126 | 10/2018 |
| CN | 109309619 | 2/2019 |
| CN | 109309619 A * | 2/2019 |
| CN | 110086720 | 8/2019 |
| KR | 10-2010-0073188 | 7/2010 |
| WO | 2013/123897 | 8/2013 |
| WO | 2017/211116 | 12/2017 |

OTHER PUBLICATIONS

Geng et al., "A Design of Inter-Domain Destination and Source Routing Based on BGP", ZTE Technology Journal, Dec. 2018, vol. 24, No. 6, Beijing, pp. 60-64. English Abstract attached.

Xu et al." Two-dimensional routing based inter-domain liaffic engineering model", J Tsinghua Univ (Sci & Technol), 2017, vol. 57, No. 12, Beijing, pp. 1233-1238. English Abstract attached.

Zhou et al., "A Solution for IP Multicast VPNs based on Virtual Routers", Institute of Electronic and Information Engineering, pp. 3175-3178, 2006.

English translation of First Search Report from corresponding Chinese Appln No. 201910325519X, dated Apr. 3, 2020.

English translation of Supplemental Search Report from corresponding Chinese Appln No. 201910325519X, dated Apr. 9, 2020.

Office Action from corresponding Chinese Appln. No. 201910325519X, dated Jan. 3, 2020. English translation attached.

Intent to Grant from corresponding Chinese Appln. No. 201910325519X, dated Apr. 20, 2020. English translation attached.

* cited by examiner

METHOD AND SYSTEM FOR IMPLEMENTING L3VPN BASED ON TWO-DIMENSIONAL ROUTING PROTOCOL

CROSS-REFERENCE TO RELATED APPLICATION

The present application is a continuation of International Application No. PCT/CN2019/115662, filed on Nov. 5, 2019, which claims priority to Chinese patent Application No. 201910325519.X, titled "METHOD AND SYSTEM FOR IMPLEMENTING L3VPN BASED ON TWO-DIMENSIONAL ROUTING PROTOCOL", filed by Tsinghua University on Apr. 22, 2019, both of which are hereby incorporated herein by reference.

FIELD

The present disclosure relates to the field of Internet routing technologies, and more particularly, to a method and system for implementing L3VPN based on a two-dimensional routing protocol.

BACKGROUND

A public network is a network built by an operator for use by public users. A virtual private network (VPN) is a remote access technology achieving the virtual private network through the public network. The virtual private network does not require an actual long-distance physical data line. Although the virtual private network shares a physical channel with other Internet services, it can perform functions of a private network having a separate physical line. Specifically, a user can access, through the VPN, an internal network of a unit (such as a company) to which the VPN belongs at different geographic locations. The user can access resources on the company's internal network at will as if the user is in the company. To use the VPN, a VPN server needs to be set up first. The user connects to the server through an account, password and other information, and then can enjoy functions provided by the VPN.

The VPN may be implemented in various ways, and there are many types of VPNs. L3VPN (Framework for Layer 3 Virtual Private Networks) is one type of VPNs. L3VPN works at a network layer of a layered architecture (physical layer, link layer, network layer, transport layer, and application layer) of the Internet. The main function of the network layer is to route through IP addresses and forward data packets generated by users to their destinations. L3VPN is still routing forwarding in essence, and requires the operator to manage user routing. Four concepts are generally involved in L3VPN instances, namely, a service provider routing device (Provider, P), a service provider edge device (Provider Edge, PE), a customer network edge device (Customer Edge, CE), and a user site (Site). P is a core routing device in the public network. PE is an edge routing device in the public network. Site is a user-end network. CE is an edge routing device of Site, and connects PE with the public network through one or more links. By managing routing between PE and CE, and between PE and PE, the operator may interconnect sites that are geographically distributed at different locations to implement VPN services.

In terms of the routing, L3VPN can be implemented through a variety of routing technologies, and also, tunneling technology is generally involved. In the present disclosure, the used routing technology is two-dimensional routing, and the used tunneling technology is IPIP tunneling, both of which will be discussed in sequence below.

The two-dimensional routing is a new type of routing protocol based on conventional Internet routing protocols. There are many conventional Internet routing protocols, such as Open Shortest Path First (OSPF) and Border Gateway Protocol (BGP). These traditional routing protocols only use a destination address of a data packet from the user to determine a forwarding path of the packet. Packets with the same destination address have the same forwarding path. This may reduce the flexibility of network routing forwarding and limit functions and services provided by the network. The two-dimensional routing intends to increase a reference dimension of routing decisions and improve the flexibility of routing forwarding. Specifically, the two-dimensional routing considers not only the destination address but also a source address during routing calculation, and packets with the same destination address and different source addresses may have different forwarding paths. The idea of the two-dimensional routing makes up for the lack of semantics of the source address in the traditional routing protocols, achieves the more flexible routing forwarding, and provides a new solution to meet diverse needs of users and service providers. Since the two-dimensional routing has been developed based on the traditional routing and can be compatible with the traditional routing, it has more advantages in deployment.

In addition to the routing technologies, the implementation of L3VPN also requires the implementation of the tunneling technology. The IPIP tunneling technology is a simple packet encapsulation technology. Simply put, it is to add a new IP header on the basis of an original packet. The new IP header has respective fields settable as required. The encapsulated packet is forwarded through a normal routing policy, but a matched address comes from the new IP header. Before the packet reaches a destination, the encapsulated new IP header will be removed, and the packet will be restored to the original packet. The IPIP tunneling technology is transparent to users at both ends, that is, the users do not know whether the packet is encapsulated or how it is encapsulated and forwarded.

SUMMARY

The present disclosure aims to solve at least one of the technical problems in the related art to some extent.

To this end, an objective of the present disclosure is to provide a method for implementing L3VPN based on a two-dimensional routing protocol. With an advantage of flexible packet control by the two-dimensional routing, the method may provide customers with better, more flexible, and more diverse services.

Another objective of the present disclosure is to provide a system for implementing L3VPN based on a two-dimensional routing protocol.

To implement the above objectives, an aspect of the present disclosure provides a two-dimensional routing protocol-based L3VPN implementation method, including: step S1 of activating an L3VPN network to obtain a route destined to each user site; step S2 of sending, by a user in a source user site, a packet to a user in a target user site, and sending the packet to an entry of a first edge routing device; step S3 of performing encapsulation by the first edge routing device based on a public network IP address of the packet; and step S4 of forwarding, by means of matching of two-dimensional routing, the encapsulated packet to an exit of the first edge routing device for decapsulation, and forwarding the encapsulated packet to the target user site via an entry of a second edge routing device.

The method for implementing L3VPN based on the two-dimensional routing protocol according to embodiments of the present disclosure achieves routing and forwarding of L3VPN by using the two-dimensional routing protocol, so that L3VPN may have advantages of the two-dimensional routing, such as control flexibility over packets and incremental deployment. It also achieves policy-based routing of the internal network through mapping of the internal network IP to an external network IP, thereby providing customers with better, more flexible, and more diverse services.

In addition, the method for implementing L3VPN based on the two-dimensional routing protocol according to embodiments of the present disclosure may also have the following additional technical features.

Further, in an embodiment of the present disclosure, said activating the L3VPN network includes: performing L3VPN configuration by an administrator, the L3VPN configuration including address mapping between a user-end internal network and a public network and a forwarding strategy of the two-dimensional routing of the encapsulated packet, wherein different <source, target> pairs of the internal network are in two-dimensional mapping to different <source, target> pairs of the public network according to different forwarding strategies generated based on different needs; and performing two-dimensional routing synchronization on the first edge routing device and the second edge routing device to obtain the route destined to each user site.

Further, in an embodiment of the present disclosure, the first edge routing device is an edge routing device of the public network, and the second edge routing device is an edge routing device of a user-end internal network.

Further, in an embodiment of the present disclosure, said step S2 includes: when the user in the source user site sends the packet to the user in the target user site, sending the packet to an exit of the second edge routing device, and then sending, by the second edge routing device, the packet to the entry of the first edge routing device.

Further, in an embodiment of the present disclosure, at said step S3, the packet is encapsulated based on address mapping between a user-end internal network and a public network.

To implement the above objectives, another aspect of the present disclosure provides a system for implementing L3VPN based on a two-dimensional routing protocol, including: an obtaining module configured to activate an L3VPN network to obtain a route destined to each user site; a sending module configured to send, by a user in a user site, a packet to a user in a target user site, and to send the packet to an entry of a first edge routing device; an encapsulation module configured to perform encapsulation by the first edge routing device based on a public network IP address of the packet; and a forwarding module configured to forward, by means of matching of two-dimensional routing, the encapsulated packet to an exit of the first edge routing device for decapsulation, and to forward the encapsulated packet to the target user site via an entry of a second edge routing device.

The system for implementing L3VPN based on the two-dimensional routing protocol according to embodiments of the present disclosure achieves routing and forwarding of L3VPN by using the two-dimensional routing protocol, so that L3VPN may have advantages of the two-dimensional routing, such as control flexibility over packets and incremental deployment. It also achieves the policy-based routing of the internal network through mapping of the internal network IP to the external network IP, thereby providing customers with better, more flexible, and more diverse services.

In addition, the system for implementing L3VPN based on the two-dimensional routing protocol according to embodiments of the present disclosure may also have the following additional technical features.

Further, in an embodiment of the present disclosure, said obtaining module includes: a configuration unit configured to perform L3VPN configuration by an administrator, the L3VPN configuration including address mapping between a user-end internal network and a public network and a forwarding strategy of the two-dimensional routing of the encapsulated packet, wherein different <source, target> pairs of the internal network are in two-dimensional mapping on different <source, target> pairs of the public network according to different forwarding strategies generated based on different needs; and a synchronization unit configured to perform two-dimensional routing synchronization on the first edge routing device and the second edge routing device to obtain the route destined to each user site.

Further, in an embodiment of the present disclosure, the first edge routing device is an edge routing device of a public network, and the second edge routing device is an edge routing device of a user-end internal network.

Further, in an embodiment of the present disclosure, the sending module is further configured to: when the user in the source user site sends the packet to the user in the target user site, send the packet to an exit of the second edge routing device, and then send, by the second edge routing device, the packet to the entry of the first edge routing device.

Further, in an embodiment of the present disclosure, in the encapsulation module, the packet is encapsulated based on address mapping between a user-end internal network and a public network.

Additional aspects and advantages of embodiments of present disclosure will be given in part in the following descriptions, become apparent in part from the following descriptions, or be learned by practice of the embodiments of the present disclosure.

BRIEF DESCRIPTION OF DRAWINGS

These and other aspects and advantages of embodiments of the present disclosure will become apparent and more readily appreciated from the following descriptions made with reference to the accompanying drawings, in which:

FIG. 2a illustrates the conventional routing and FIG. 2b illustrates the two-dimensional routing;

DETAILED DESCRIPTION

Figure 1:
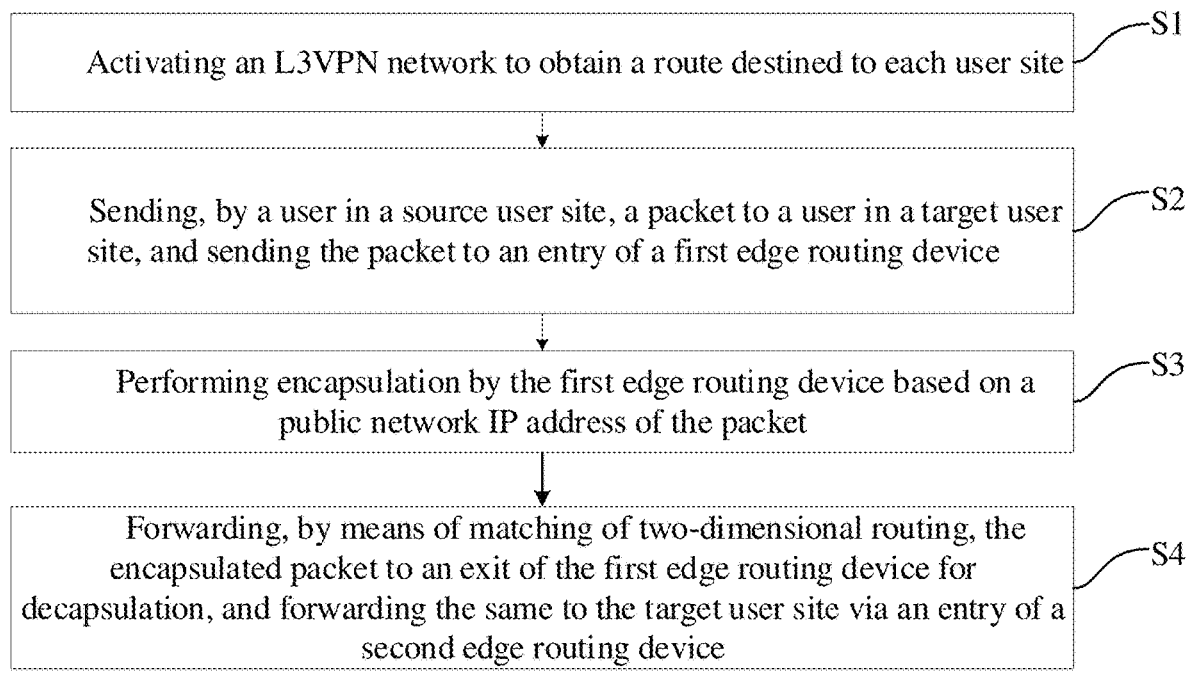
FIG. 1 is a flowchart of a method for implementing L3VPN based on a two-dimensional routing protocol according to embodiments of the present disclosure.

Descriptions will now be made in detail to embodiments, examples of which are illustrated in the accompanying drawings. The same or similar elements and the elements having same or similar functions are denoted by like reference numerals throughout the specification. The embodiments described herein with reference to the drawings are illustrative, and aim to explain the present disclosure. The embodiments shall not be construed to limit the present disclosure.

A method and system for implementing L3VPN based on a two-dimensional routing protocol according to embodiments of the present disclosure will be described below with reference to the accompanying drawings. The method for implementing L3VPN based on the two-dimensional routing protocol according to embodiments of the present disclosure will be described first.

It should be noted that there may be diverse mapping rules between a customer edge (CE) and a provider edge (PE) and between an internal network IP and a public network IP in the same virtual private network (VPN). For an internal network IP of a site, even if a destination site is the same, a public network IP mapped by the site may be different. A two-dimensional routing protocol is used for routing between PEs in the same VPN network, and thus a forwarding path of a packet may be flexibly controlled through the public network IP. The internal network IP implements a two-dimensional routing policy through the public network IP, thereby indirectly implementing policy-based routing of an internal network.

FIG. 1 is a flowchart of a method for implementing L3VPN based on a two-dimensional routing protocol according to embodiment of the present disclosure.

As illustrated in FIG. 1, the method for implementing L3VPN based on the two-dimensional routing protocol includes the following steps.

At step S1, an L3VPN network is activated to obtain a route destined to each user site.

Further, in an embodiment of the present disclosure, activating the L3VPN network includes: performing, by an administrator, L3VPN configuration, which includes address mapping between a user-end internal network and a public network and a forwarding strategy of the two-dimensional routing of the encapsulated packet; and performing two-dimensional routing synchronization on a first edge routing device and a second edge routing device to obtain the route destined to each user site.

Specifically, the L3VPN configuration performed by the administrator includes address mapping between an internal network and a public network, a forwarding strategy of the two-dimensional routing of the encapsulated packet, and so on. The address mapping between the internal network and the public network is mapping between a <source, destination> pair of the internal network and a <source, destination> pair of the public network. The configuration of the mapping relationship is based on a routing policy of the <source, destination> pair of the internal network, and the routing policy refers to a forwarding path of a packet carrying the <source, destination> pair.

Different <source, destination> pairs of the internal network may have different routing policies due to different requirements (such as privacy protection, etc.), and thus may be mapped to different <source, destination> pairs of the public network. The packet will be forwarded after being encapsulated based on the mapping, so a final routing policy is determined by the public network IP address of the encapsulated packet. The administrator configures the two-dimensional routing protocol based on an actual routing policy corresponding to the <source, destination> pair of the public network to meet policy requirements of the internal network.

The first edge routing device is an edge routing device of the public network, and the second edge routing device is an edge routing device of a user-end internal network.

In other words, routing synchronization is performed on the PE and the CE to obtain routes destined to each site.

At step S2, a user in a source user site sends a packet to a user in a target user site, and the packet is sent to an entry of the first edge routing device.

Further, in an embodiment of the present disclosure, when the user in the source user site sends the packet to the user in the target user site, the packet is sent to an exit of the second edge routing device, and then, the second edge routing device sends the packet to the entry of the first edge routing device.

In other words, if a user in one site sends a packet to a user in another site, the packet will be sent to an entry of the CE, and then reaches an entry PE of the public network through the CE.

At step S3, the first edge routing device performs encapsulation based on a public network IP address of the packet.

Further, in an embodiment of the present disclosure, the packet is encapsulated based on the address mapping between the user-end internal network and the public network.

It may be understood that after the PE matches the internal network IP address of the packet, the packet is encapsulated in such a manner that the packet is matched to the public network IP address, and then the packet is forwarded.

At step S4, the encapsulated packet is forwarded, by means of matching of two-dimensional routing, to an exit of the first edge routing device for decapsulation, and is forwarded to the target user site via an entry of the second edge routing device.

In other words, the encapsulated packet is forwarded to an exit PE through matching of the two-dimensional routing, and finally reaches a destination site through an entry CE.

In order to understand working principles of embodiments of the present disclosure, working principles of the two-dimensional routing need to be explained first.

Figure 2A:
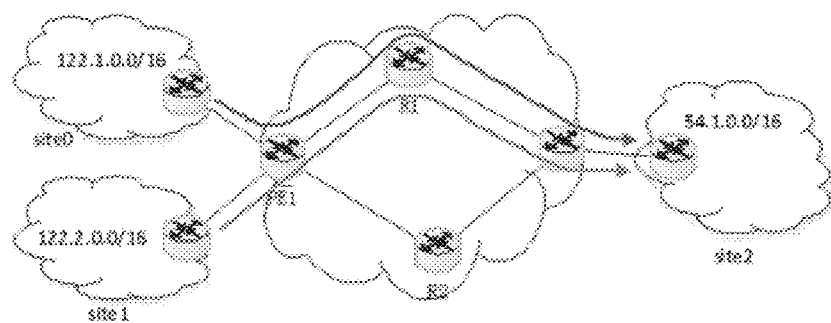
FIGS. 2a and 2b show a comparison between conventional routing and two-dimensional routing, where
Figure 2B:
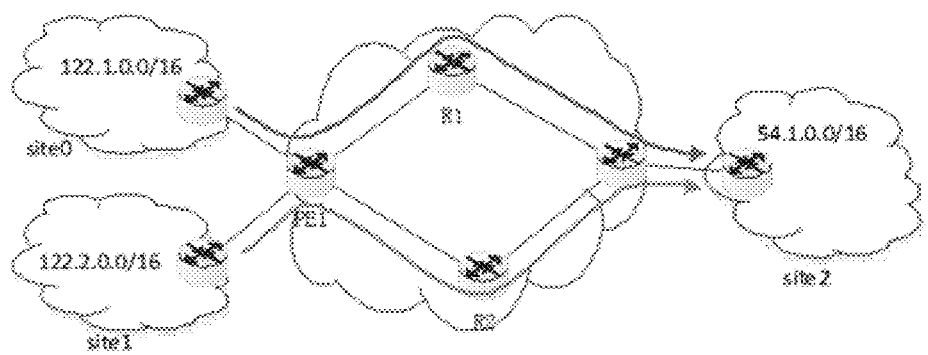

As illustrated in FIG. 2*a*, site0, site1, and site2 are connected to a common operator network. Each of the three sites is assigned with an IP address, i.e., 122.1.0.0/16, 122.2.0.0/16, and 54.1.0.0/16, respectively. All operator routers run the conventional routing. When PE1 running the conventional routing receives packets from site0 and site1 to site2, PE1 only matches destination addresses of the packets, so that packets destined to the address of 54.1.0.0/16 will be sent from the same interface, i.e., to R1. FIG. 2*b* illustrates a similar network scenario, except that all operator routers run the two-dimensional routing. When a router running the two-dimensional routing receives a packet, the router not only matches a destination IP address of the packet, but also matches a source address of the packet. Packets with the same destination address but different source addresses may be sent from different exits. In the embodiments, when PE1 running the two-dimensional routing receives the packets from site0 and site1 to site2, although destination IP addresses of the packets belong to the network segment of 54.1.0.0/16, the packet from site0 is sent to R1, and the packet from site1 is sent to R2, for the reason that source addresses of site 0 and site 1 belong to 122.1.0.0/16 and 122.2.0.0/16, respectively.

The method for implementing L3VPN based on the two-dimensional routing protocol according to embodiments of the present disclosure will be described in detail below in combination with three examples.

Example 1

Figure 3:
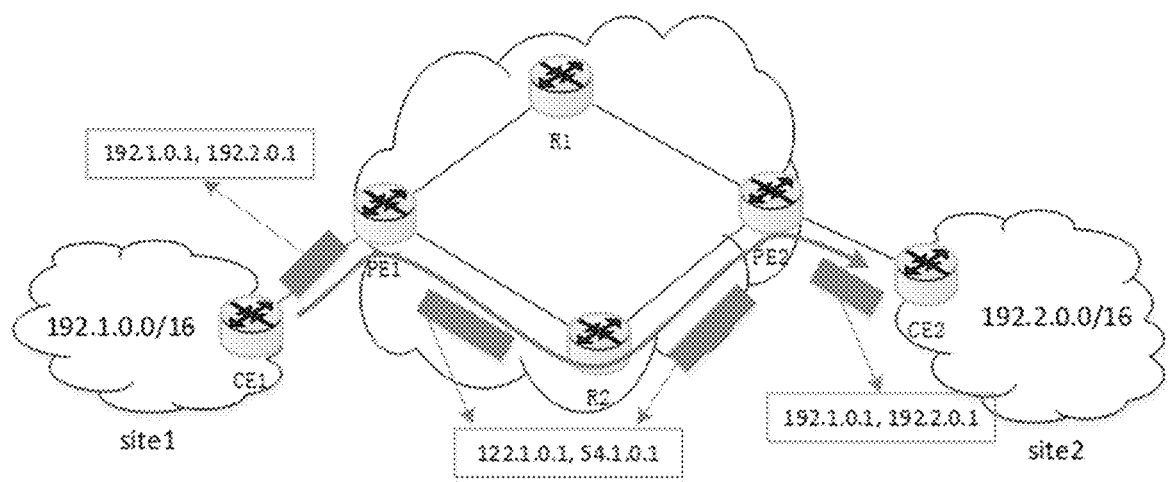
FIG. 3 is an example of a basic application scenario of a two-dimensional routing L3VPN according to embodiments of the present disclosure.
Figure 4:
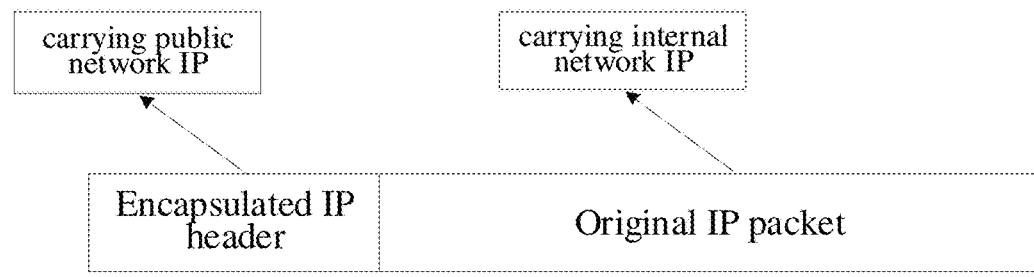
FIG. 4 is a schematic diagram of IPIP encapsulation according to embodiments of the present disclosure.

As illustrated in FIG. 3, site1 and site2 are respectively connected to one operator network, and belong to the same VPN service. The internal network IP segment of site1 is 192.1.0.0/16, and the internal network IP segment of site2 is 192.2.0.0/16. A router in the operator network runs the two-dimensional routing. Assuming that a packet having a source address of 192.1.0.1 and a destination address of 192.2.0.1 is sent from site1 to site2, the packet will be sent from CE1 to PE1. PE1 determines a <source, destination> pair of the public network corresponding to a <source, destination> pair carried by the packet based on a mapping relationship. Then, the packet is encapsulated based on the IPIP manner illustrated in FIG. 4, that is, an IP header carrying the address pair of the public network is inserted into the original one. It should be pointed out that an address of the public network corresponding to the mapping relationship, on one hand, may ensure that the packet is forwarded to a destination exit router PE, and on the other hand, may facilitate ensuring the routing policy. For example, in this example, it is necessary to ensure that the packet has to pass through a router R2 to reach an exit router PE2. After the packet is forwarded to PE2 through the two-dimensional routing, PE2 will decapsulate the packet, that is, removing the encapsulated IP header to restore the packet to the original packet. Then, the original packet is sent to CE2 and finally reaches a destination host.

Example 2

Figure 5:
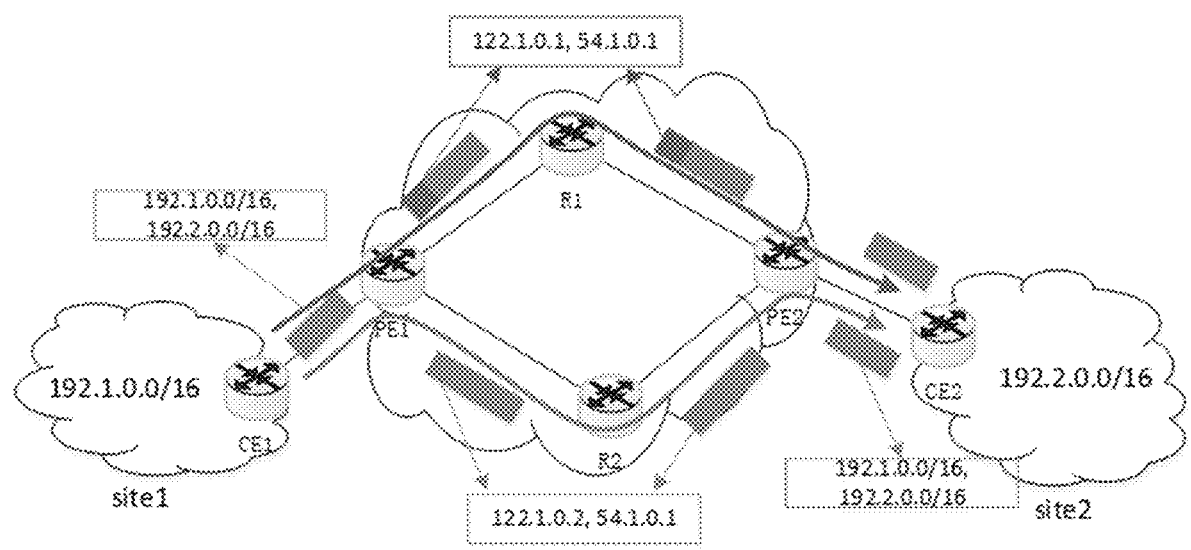
FIG. 5 is an example of a load balancing scenario of a two-dimensional routing L3VPN according to embodiments of the present disclosure.

As illustrated in FIG. 5, in this embodiment of the present disclosure, packets sent from site1 to site2 carries an address pair of <192.1.0.0/16, 192.2.0.0/16>, are encapsulated at PE1, and then are forwarded to the exit router PE2. In order to achieve an effect of load balancing of network traffic, PE1 may encapsulate the original packets at a certain proportion of the address pair of the public network. For example, in this example, for the packets carrying <192.1.0.0/16, 192.2.0.0/16>, PE1 encapsulates 50% of the packets into packets carrying <122.1.0.1, 54.1.0.1>, which will reach PE2 through a router R1, and encapsulates the other 50% of the packets into packets carrying <122.1.0.2, 54.1.0.1>, which will reach PE2 through a router R2. In this way, the effect of load balancing can be achieved.

Example 3

Figure 6:
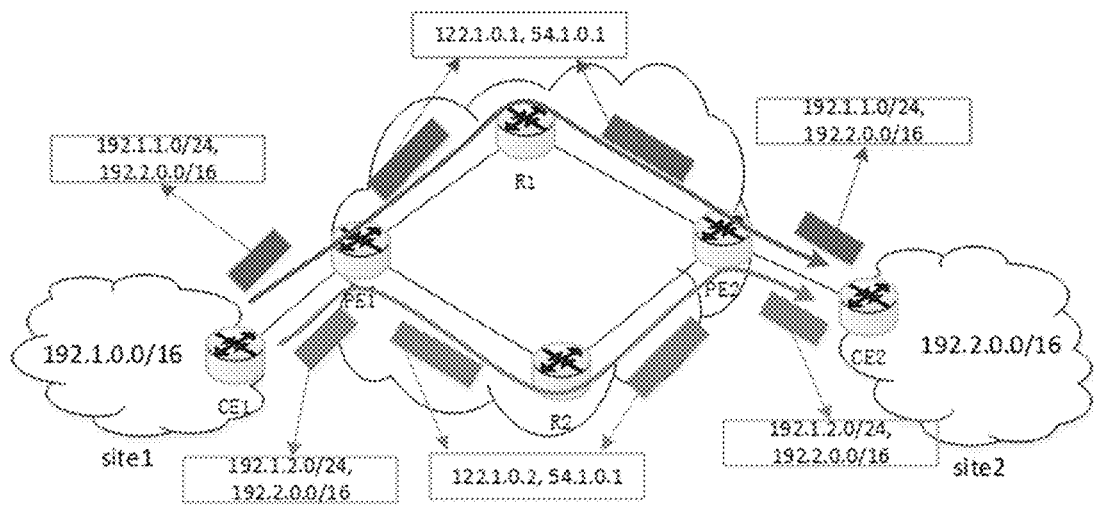
FIG. 6 is an example of a policy-based routing scenario of an internal network of a two-dimensional routing L3VPN according to embodiments of the present disclosure.

FIG. 6 is a scenario for distinguishing services of an internal network. For example, in site1, a packet having an address of 192.1.1.0/24 refers to common customer information and may be forwarded via a regular path (a path passing through R1) to a destination site2. A packet having an address of 192.1.2.0/24 refers to confidential information, and needs to be forwarded separately via a highly secure path (a path passing through R2, which, for example, is deployed with a security detection device) before reaching the destination site2. Therefore, a customer requirement according to the embodiment of the present disclosure is that the packet carrying <192.1.1.0/24, 192.2.0.0/16> is forwarded to PE2 through R1, and the packet carrying <192.1.2.0/24, 192.2.0.0/16> is forwarded to PE2 through R2. Therefore, when PE1 receives a packet, it needs to match the address pair of the internal network of the packet, and then encapsulates the packet into a different address pair of the public network, so as to reach the exit router PE2 through different intermediate routers.

The method for implementing L3VPN based on the two-dimensional routing protocol according to the embodiments of the present disclosure may achieve routing and forwarding of L3VPN by using the two-dimensional routing protocol, so that L3VPN may have advantages of the two-dimensional routing, such as control flexibility over packets and incremental deployment. It also achieves policy-based routing of the internal network through mapping of the internal network IP to an external network IP, thereby providing customers with better, more flexible, and more diverse services.

A system for implementing L3VPN based on a two-dimensional routing protocol according to embodiments of the present disclosure will be described below with reference to the accompanying drawings.

Figure 7:
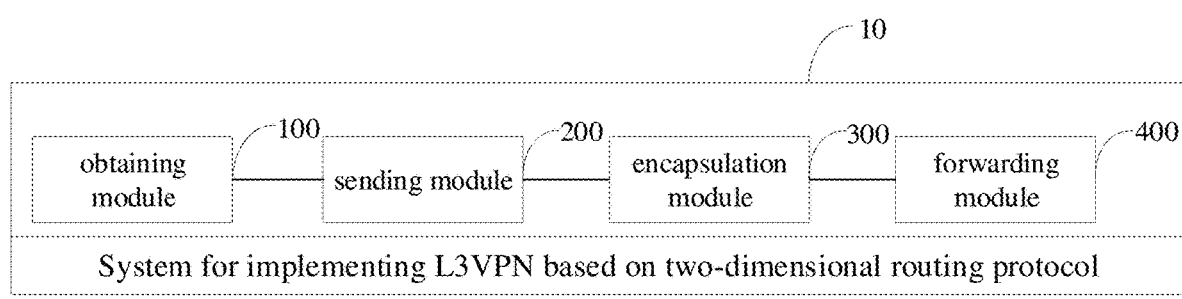
FIG. 7 is a schematic diagram illustrating a structure of a system for implementing L3VPN based on a two-dimensional routing protocol according to embodiments of the present disclosure.

FIG. 7 is a schematic diagram illustrating a structure of a system for implementing L3VPN based on a two-dimensional routing protocol according to embodiments of the present disclosure.

As illustrated in FIG. 7, a system 10 for implementing L3VPN based on a two-dimensional routing protocol includes an obtaining module 100, a sending module 200, an encapsulation module 300, and a forwarding module 400.

The obtaining module 100 is configured to activate an L3VPN network to obtain a route destined to each user site.

The sending module 200 is configured to send, by a user in a source user site, a packet to a user in a target user site, and to send the packet to an entry of a first edge routing device. The encapsulation module 300 is configured to perform, by the first edge routing device, encapsulation based on a public network IP address of the packet. The forwarding module 400 is configured to forward, by means of matching of two-dimensional routing, the encapsulated packet to an exit of the first edge routing device for decapsulation, and to forward the same to the target user site via an entry of a second edge routing device. The system 10 for implementing L3VPN based on the two-dimensional routing protocol according to embodiments of the present disclosure inherits advantages of the two-dimensional routing, such as control flexibility, scalability based on existing protocols, and incremental deployment, and can meet functional requirements of VPN while achieving policy-based routing within one VPN network.

Further, in an embodiment of the present disclosure, the obtaining module 100 includes a configuration unit and a synchronization unit. The configuration unit is configured to perform L3VPN configuration by an administrator. The L3VPN configuration includes address mapping between a user-end internal network and a public network and a forwarding strategy of the two-dimensional routing of the encapsulated packet. The synchronization unit is configured to perform two-dimensional routing synchronization on the first edge routing device and the second edge routing device to obtain the route destined to each user site.

Further, in an embodiment of the present disclosure, the first edge routing device is an edge routing device of the public network, and the second edge routing device is an edge routing device of a user-end internal network.

Further, in an embodiment of the present disclosure, the sending module is further configured to: when the user in the source user site sends the packet to the user in the target user site, send the packet to an exit of the second edge routing device, and then send, by the second edge routing device, the packet to the entry of the first edge routing device.

Further, in an embodiment of the present disclosure, in the encapsulation module, the packet is encapsulated according to address mapping between a user-end internal network and a public network.

It should be noted that the foregoing explanation of embodiments of the method for implementing L3VPN based on the two-dimensional routing protocol is also applicable to the system, and thus, will not be repeated here.

The system for implementing L3VPN based on the two-dimensional routing protocol according to the embodiments of the present disclosure may achieve routing and forwarding of L3VPN by using the two-dimensional routing protocol, so that L3VPN may have advantages of the two-dimensional routing, such as control flexibility over packets and incremental deployment. It also achieves policy-based routing of an internal network through mapping of the internal network IP to an external network IP, thereby providing customers with better, more flexible, and more diverse services.

In addition, terms such as "first" and "second" are used herein for purposes of description and are not intended to indicate or imply relative importance or significance. Furthermore, the feature defined with "first" and "second" may include one or more such feature distinctly or implicitly. In the description of the present disclosure, "a plurality of" means at least two, such as two, three, etc., unless specified otherwise.

In the description of the present disclosure, unless specified and limited otherwise, the terms "mounted" "connected" and "coupled" should be understood broadly, such as being connected fixedly, being mounted detachably, or being integrated, and can be mechanical or electrical connections; direct connections or indirect connections via an intermediary; or intercommunication or interactions between two elements. For those skilled in the art, specific meanings of the above terms in the present disclosure may be understood according to specific circumstances.

In the description of the present disclosure, unless specified and limited otherwise, a first feature being "above" or "below" a second feature may indicate that the first feature is in direct contact with the second feature, or the first feature and the second feature contact with each other through an intermediate medium. In addition, the first feature being "above", "on top of" and "over" the second feature indicates that the first feature is directly above and obliquely above the second feature, or that the first feature is higher than the second feature horizontally. The first feature being "below", "lower than", and "under" the second feature indicates that the first feature is directly below or obliquely below the second feature, or that the first feature is lower than the second feature horizontally.

Reference throughout this specification to a term such as "an embodiment", "some embodiments", "an example", "a specific example", or "some examples" means that a particular feature, structure, material, or characteristic described in combination with the embodiment or example is included in at least one embodiment or example of the present disclosure. In this specification, exemplary descriptions of aforesaid terms are not necessarily referring to the same embodiment or example. Furthermore, the described specific features, structures, materials or characteristics may be combined in any one or more embodiments or examples in any suitable manner. In addition, those skilled in the art may combine different embodiments or examples and features of different embodiments or examples described in the specification without mutual contradiction.

Although embodiments of present disclosure have been illustrated and described above, it should be understood that above embodiments are just explanatory, and cannot be construed to limit the present disclosure. For those skilled in the art, changes, alternatives, and modifications may be made to the embodiments without departing from the scope of the present disclosure.

What is claimed is:

1. A method for implementing L3VPN based on a two-dimensional routing protocol, comprising:
   step S1 of activating an L3VPN network to obtain a route destined to each user site;
   step S2 of sending, by a user in a source user site, a packet to a user in a target user site, and sending the packet to an entry of a first edge routing device;
   step S3 of performing encapsulation by the first edge routing device based on a public network IP address of the packet; and
   step S4 of forwarding, by means of matching of two-dimensional routing, the encapsulated packet to an exit of the first edge routing device for decapsulation, and forwarding the encapsulated packet to the target user site via an entry of a second edge routing device,
   wherein said activating the L3VPN network comprises:
   performing L3VPN configuration by an administrator, the L3VPN configuration comprising address mapping between a user-end internal network and a public network and a forwarding strategy of the two-dimensional routing of the encapsulated packet, wherein different <source, target> pairs of the internal network are in two-dimensional mapping to different <source, target> pairs of the public network according to different forwarding strategies generated based on different needs; and
   performing two-dimensional routing synchronization on the first edge routing device and the second edge routing device to obtain the route destined to each user site,
   wherein at said step S3, the packet is encapsulated based on the address mapping between the user-end internal network and the public network to include an IP header comprising the address pair of the public network.

2. The method of claim 1, wherein the first edge routing device is an edge routing device of the public network, and the second edge routing device is an edge routing device of a user-end internal network.

3. The method of claim 1, wherein said step S2 comprises:
   when the user in the source user site sends the packet to the user in the target user site, sending the packet to an exit of the second edge routing device, and then sending, by the second edge routing device, the packet to the entry of the first edge routing device.

4. A system for implementing L3VPN based on a two-dimensional routing protocol, comprising:
   a memory having instructions stored thereon; and
   a processor,
   wherein the instructions, when executed by the processor, cause the processor to perform a method for implementing L3VPN based on a two-dimensional routing protocol, the method comprising:

step S1 of activating an L3VPN network to obtain a route destined to each user site;

step S2 of sending, by a user in a user site, a packet to a user in a target user site, and to send the packet to an entry of a first edge routing device;

step S3 of performing encapsulation by the first edge routing device based on a public network IP address of the packet; and step S4 of forwarding, by means of matching of two-dimensional routing, the encapsulated packet to an exit of the first edge routing device for decapsulation, and forwarding the encapsulated packet to the target user site via an entry of a second edge routing device, wherein said activating the L3VPN network comprises:

performing L3VPN configuration by an administrator, the L3VPN configuration comprising address mapping between a user-end internal network and a public network and a forwarding strategy of the two-dimensional routing of the encapsulated packet, wherein different <source, target> pairs of the internal network are in two-dimensional mapping to different <source, target> pairs of the public network according to different forwarding strategies generated based on different needs; and performing two-dimensional routing synchronization on the first edge routing device and the second edge routing device to obtain the route destined to each user site, wherein at said step S3, the packet is encapsulated based on address mapping between a user-end internal network and a public network to include an IP header comprising the address pair of the public network.

5. The system of claim 4, wherein the first edge routing device is an edge routing device of a public network, and the second edge routing device is an edge routing device of a user-end internal network.

6. The system of claim 4, wherein said step S2 comprises:

when the user in the source user site sends the packet to the user in the target user site, sending the packet to an exit of the second edge routing device, and then sending, by the second edge routing device, the packet to the entry of the first edge routing device.

* * * * *